Jan. 22, 1963

H. L. ROBINSON 3,074,404

DRAINAGE RECEIVER

Filed May 16, 1961

INVENTOR.
Herman L. Robinson
BY
Fred C. Matheny
ATTORNEY

United States Patent Office 3,074,404
Patented Jan. 22, 1963

3,074,404
DRAINAGE RECEIVER
Herman L. Robinson, Seattle, Wash.
(28261 48th Ave. S., Auburn, Wash.)
Filed May 16, 1961, Ser. No. 110,489
2 Claims. (Cl. 128—283)

My invention relates to a drainage receiver for application over an artificially formed elimination opening in the abdominal portion of the body to receive body waste and said invention is applicable to persons who have undergone ileostomy, colostomy, ileo-bladder, ureterostomy, cutaneous vesicostomy and like operations.

A drainage receiving appliance of this nature essentially comprises a body engaging part for making liquid tight contact with the skin around an artificially formed elimination opening and a bag or like receptacle connected therewith to receive the waste. Such an elimination opening may be flush with the exterior of the body or it may be through a stoma which protrudes from the body. It is common practice to use belts to hold these appliances against the body and to adhesively secure them to the body around the elimination opening for the purpose of forming a liquid seal. This method of adhesively securing the appliance to the skin around the elimination opening often results in extreme discomfort to the wearer, to such an extent that, in some instances, the adhesively secured appliance can not be endured and about all the wearer can do is to apply absorbent material over the opening.

An object of my invention is to provide an appliance of this nature by which a liquid tight seal between the appliance and a part of the body around an artificially formed elimination opening can be formed and maintained without adhesively securing any part of the appliance to the body and with a reasonable degree of comfort to the wearer, making it possible for the wearer to sleep comfortably in bed and to do normal work and engage in normal bodily activities and to be reasonably comfortable at all times.

Another object of my invention is to provide an appliance of this nature which, when it is used over a protruding stoma, will receive and fully protect the stoma.

Another object is to provide an appliance of this nature comprising a bulbous body engaging part which is convex and approximately spherical on the inner side thereof, which engages the body, and is concave and approximately bell shape on the side thereof outwardly from the body, said appliance being capable of being pressed against the body firmly enough, without discomfort to the user, to form a liquid tight seal between the convex side of the appliance and the body around an elimination opening.

Another object is to provide an appliance of this nature which is formed of a plastic material that is light in weight, strong and non-yielding, non-irritating to the body, not cold to the touch and sanitary and easily cleaned.

Other objects are to provide an appliance of this nature which is simple, efficient, durable, not expensive to make, and one which is easy to apply and to wear.

Other objects of the invention will be apparent from the following description and accompanying drawings.

In the drawings FIGURE 1 is a fragmentary view in front elevation of a drainage receiver appliance constructed in accordance with my invention.

Like reference numerals refer to like parts throughout the several views.

Figure 1:
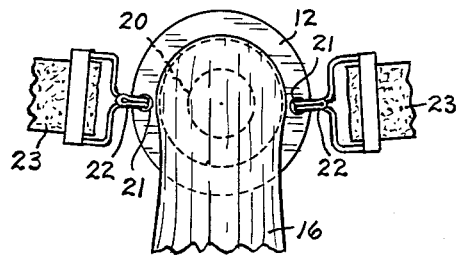

My drainage receiver comprises a bulbous or ball shaped body engaging part 10 having a substantially spherical body engaging wall 11. A radially extending integral annular flange 12 is formed on the outer end portion of the body engaging part 10 and an integral annular neck 13 protrudes from the outer side of the flange 12, this being the side of said flange 12 opposite to the body engaging part 10. The neck 13 terminates in a narrow, outwardly extending, annular lip 14 which is spaced a short distance from the flange 12 and cooperates with said flange 12 in forming an annular groove 15 to receive the open end portion of a pliable liquid tight bag or pouch 16. A rubber band 17 can be used to secure the bag 16 to the neck 12.

A centrally disposed, tapered, bell shaped, outwardly expanding passageway 18 extends through the parts 10, 12 and 13. The inner end of the passageway 18 forms a centrally positioned receiver opening 20 in the otherwise approximately spherical wall of the part 10. The passageway 18 is of outwardly expanding shape and it extends from the receiver opening 20 to the marginal terminal portion of the neck 13. The receiver opening 20 is usually circular but it can be made oval or oblong in instances where this shape is more advantageous. The passageway 18 serves as a drainage conduit and as a protective stoma receiving chamber, as hereinafter explained. At least two oppositely positioned perforations 21 are provided in the flange 12 to receive hooks 22 or similar readily detachable fastening devices on the ends of an elastic belt 23.

Figure 5:
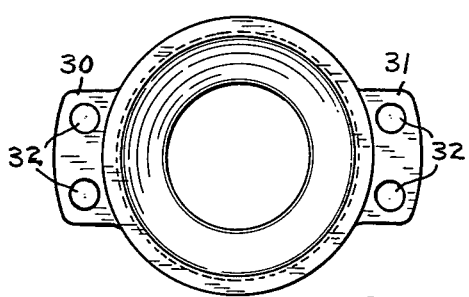
FIG. 5 is an elevational view similar to FIG. 4 showing a modified form of the invention.

The annular flange 12 strengthens my appliance and makes it easier to handle but the chief function of this flange 12 is that of a belt attachment means and parts of this flange can be omitted, as illustrated in FIG. 5, without imparing its belt attachment function. The appliance shown in FIG. 5 is the same as the one shown in FIGS. 1 to 4 except that two oppositely positioned radially extending belt attachment tabs 30 and 31, each having two spaced apart perforations 32 therein, are provided instead of the flange 12. When two perforations 32 are thus provided for connection with each end of a belt a suitable belt fitting to engage within both perforations is preferably used.

Figure 2:
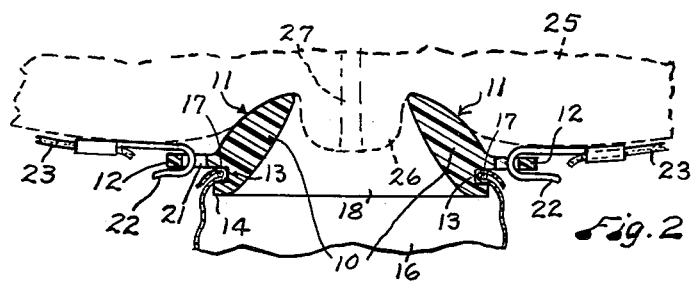
FIG. 2 is a fragmentary sectional view, on a larger scale than FIG. 1, illustrating my appliance as it may appear when used on a person having a stoma, parts of the user being diagrammatically shown by broken lines.
Figure 3:
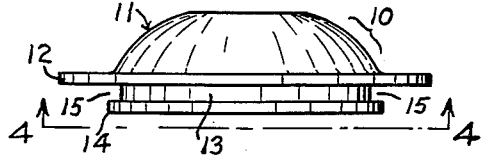
FIG. 3 is an edge view, with the bag or pouch and belt detached, showing the body engaging member of this appliance.
Figure 4:
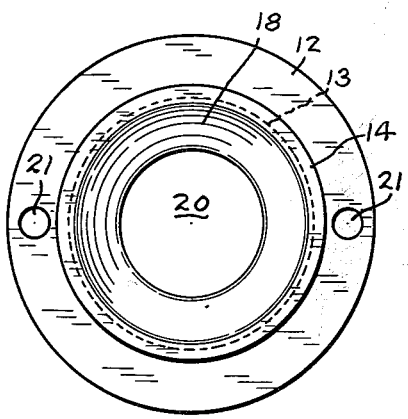
FIG. 4 is a view in elevation looking in the direction indicated by broken line 4—4 of FIG. 3.

FIG. 2 is illustrative of the use of my appliance. In said FIG. 2 a fragment of the abdominal portion 25 of the user of the appliance and a protruding stoma 26 having therein an opening 27 are illustrated by broken lines. Some patients whereon my appliance is used have a protruding stoma. In others the elimination opening is flush with the surface of the body. My appliance is well suited for use in both of these instances and is highly efficient in protecting a protruding stoma, the stoma being received and shielded within the outwardly expanding passageway 18 of the rigid and non-flexible member 10, 12, 13. In instances involving protruding stomas, where applicant has substituted his appliance for others previously worn, he has noted a substantial reduction in the size of the stoma. He attributes this to the protection afforded to the stoma by his appliance. The ball shaped part with body engaging wall 11 is of small enough size so that when it is firmly drawn by the belt 23 against the body it will indent itself into and firmly contact the body and seal against the skin especially around the fairly narrow rounded margin of the opening 20.

The elastic belt 23 is sized to fit snugly but not uncomfortably tight. The pull of this belt presses the ball shaped body engaging part 10 of the appliance firmly against the body and indents it into the soft part of the abdomen around the elimination opening or stoma and forms a seal which will ordinarily prevent leakage between the appliance and the body. The outwardly expanding shape of the passageway 18 tends to promote rapid outward drainage of liquids for all normal upright and prone positions of the body.

The foregoing description and accompanying drawings clearly disclose a preferred embodiment of my invention but it will be understood that this disclosure is merely illustrative and that changes may be made within the scope of the following claims.

I claim:

1. A drainage receiver for application over an elimination opening in the human body comprising a ball shaped body engaging part of rigid plastic material having an approximately spherical bulbous body engaging wall and having therein a tapered passageway terminating at one end in said body engaging wall and forming in said body engaging wall a centrally positioned receiver opening; a neck rigid with the outer end portion of said body engaging part, said tapered passageway extending continuously and expandingly from said receiver opening to the marginal portion of said neck and forming a protective stoma receiving chamber, said receiver opening being adapted to register with an elimination opening in the body, the substantially spherical bulbous body engaging wall being of relatively small size whereby it will indent into the body and provide a liquid tight seal around said registering openings when the body engaging member is held firmly in contact with the body; and a belt connected with said body engaging member capable of holding said body engaging member firmly against the body.

2. A drainage receiver for application over an artificially formed elimination opening in the human body comprising a ball shaped body engaging part having an approximately spherical bulbous external body engaging wall and having therein a tapered passageway intersecting said body engaging wall and forming in said body engaging wall a centrally positioned receiver opening; an annular flange extending radially from the outer end of said body engaging part; a centrally positioned neck of smaller diameter than said annular flange extending outwardly from the side of said flange opposite said ball shaped body engaging part; an outwardly extending annular lip on the outer end portion of said neck cooperating with said flange in forming an external annular groove around said neck, said passageway extending continuously and expandingly from said receiver opening to the marginal portion of said neck and forming a protective stoma receiving chamber, said passageway being adapted to register with an artificially formed elimination opening in the body and the substantially spherical bulbous body engaging wall being of relatively small size whereby it will indent into the body and provide a liquid tight seal around said registering openings when said body engaging member is held in firm contact with the body; an elastic body belt connected with said flange; and a liquid tight bag having its upper end portion tightly engaged over said neck.

References Cited in the file of this patent

UNITED STATES PATENTS

| | | |
|---|---|---|
| 2,584,540 | Botvin et al. | Feb. 5, 1952 |
| 2,663,299 | Shull | Dec. 22, 1953 |
| 2,818,069 | Fenton | Dec. 31, 1957 |